(12) United States Patent
Stern et al.

(10) Patent No.: US 11,371,637 B2
(45) Date of Patent: Jun. 28, 2022

(54) PIPE FITTING PLACEMENT DEVICE

(71) Applicant: Mueller International, LLC, Atlanta, GA (US)

(72) Inventors: Timothy Wayne Stern, Macon, IL (US); Jeffrey Allen Huffman, Monticello, IL (US)

(73) Assignee: Mueller International, LLC, Atlanta, GA (US)

( * ) Notice: Subject to any disclaimer, the term of this patent is extended or adjusted under 35 U.S.C. 154(b) by 437 days.

(21) Appl. No.: 16/580,966

(22) Filed: Sep. 24, 2019

(65) Prior Publication Data

US 2021/0088165 A1 Mar. 25, 2021

(51) Int. Cl.
*F16L 41/06* (2006.01)
*F16L 3/10* (2006.01)
*F16L 41/04* (2006.01)

(52) U.S. Cl.
CPC .............. *F16L 41/06* (2013.01); *F16L 3/105* (2013.01); *F16L 41/045* (2013.01)

(58) Field of Classification Search
CPC . F16L 55/18; F16L 55/10; F16L 41/12; F16L 41/14; F16L 41/06; F16L 41/045; F16L 31/05; F16L 3/105
USPC .......................................... 137/318; 285/197
See application file for complete search history.

(56) References Cited

U.S. PATENT DOCUMENTS

| | | | | |
|---|---|---|---|---|
| 5,058,620 A | * | 10/1991 | Jiles ...................... | F16L 55/132 408/101 |
| 6,004,412 A | * | 12/1999 | Grigory et al. ..... | B29C 66/8322 138/97 |
| 6,142,165 A | * | 11/2000 | Wartel et al. ........... | F16L 41/06 29/559 |
| 6,761,511 B2 | * | 7/2004 | Turner ................. | B25H 1/0064 408/92 |
| 2016/0047509 A1 | * | 2/2016 | Long ...................... | F16L 55/18 138/99 |

OTHER PUBLICATIONS

Drawings of a pipe fitting placement device, publicly used by another prior to Sep. 24, 2019, 11 pgs.

* cited by examiner

*Primary Examiner* — Kevin L Lee
(74) *Attorney, Agent, or Firm* — Taylor English Duma LLP

(57) ABSTRACT

A pipe fitting placement system includes a fitting holder including a bar defining a fitting bore proximate to a first end of the bar, the bar further defining a second end distal from the first end, the bar being elongated in a longitudinal direction extending from the first end to the second end; and a saddle coupled to the bar proximate to the second end of the bar, the saddle rotatable about a saddle pivot axis with respect to the bar; and a pipe fitting received within the fitting bore of the fitting holder.

20 Claims, 11 Drawing Sheets

PIPE FITTING PLACEMENT DEVICE

TECHNICAL FIELD

Field of Use

This disclosure relates to systems for tapping pipes, the fluid contents of which may be unknown. More specifically, this disclosure relates to pipe fitting placement devices for such systems able to hold a pipe fitting in place on and otherwise access fluid in the pipes to be tapped.

Related Art

Fluid distribution systems such as used for the distribution of water, natural gas, and other raw fluid materials can comprise pipes extending long distances. It is possible that, over time in the process of maintaining, reconfiguring, and replacing the systems, sections of pipe can become isolated from other sections of pipe or from the fluid source and, absent accurate records (that are definitely known to be accurate), it can be unclear whether any particular section of pipe is in use—and pressurized—and to what degree. It can also be difficult to properly tap into such a pipe at least due to the pressures potentially involved, the variable and often curved surfaces of the pipe, and the hardness of the material forming the pipe.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a pipe fitting placement system comprising: a fitting holder comprising: a bar defining a fitting bore proximate to a first end of the bar, the bar further defining a second end distal from the first end, the bar being elongated in a longitudinal direction extending from the first end to the second end; and a saddle coupled to the bar proximate to the second end of the bar, the saddle rotatable about a saddle pivot axis with respect to the bar; and a pipe fitting received within the fitting bore of the fitting holder.

In a further aspect, disclosed is a fitting holder for a pipe fitting placement device, the fitting holder comprising: a bar defining a fitting bore proximate to a first end of the bar, the bar further defining a second end distal from the first end, the bar being elongated in a longitudinal direction extending from the first end to the second end; and a saddle coupled to the bar proximate to the second end of the bar, the saddle rotatable about a saddle pivot axis with respect to the bar.

In yet another aspect, disclosed is a method of using a pipe fitting placement device, the method comprising: receiving a pipe fitting within a fitting bore of the device, the device comprising: a bar defining a fitting bore proximate to a first end of the bar, the bar further defining a second end distal from the first end, the bar being elongated in a longitudinal direction extending from the first end to the second end; and a saddle coupled to the bar proximate to the second end of the bar, the saddle rotatable about a saddle pivot axis with respect to the bar; positioning the pipe fitting against an outer surface of a pipe; and positioning the device against the outer surface of the pipe.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
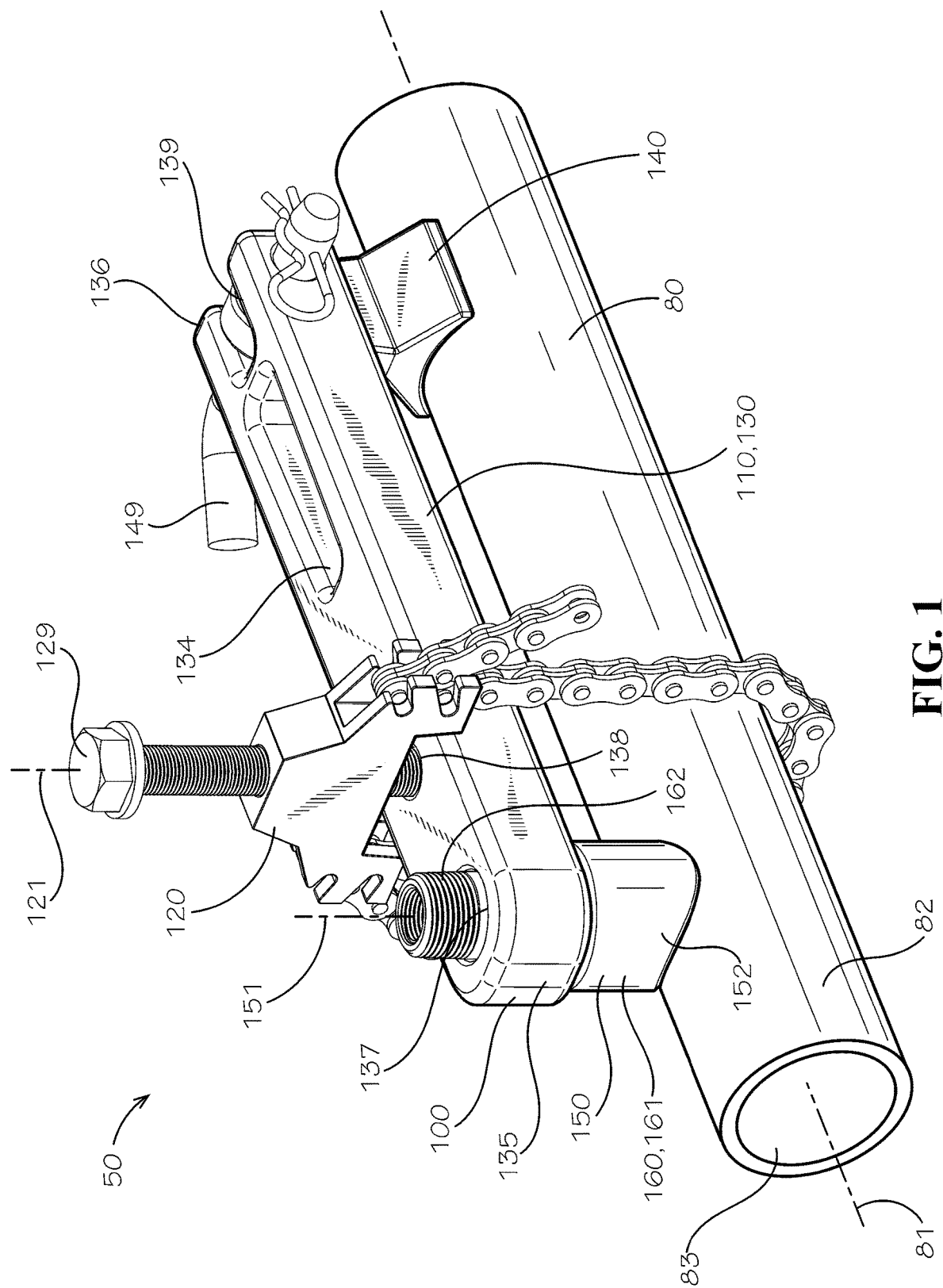
FIG. 1 is a perspective view of a pipe fitting placement system comprising a pipe fitting placement device assembled to a pipe fitting and a pipe in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the pipe fitting placement system nearest to and occupied by a pipe fitting of the system; "rear" is that end of the system that is opposite or distal the front; "left" is that which is to the left of or facing left from the fitting while a viewer positioned between the front and the rear of the system is facing away from the rear and facing toward the front; and "right" is that which is to the right of or facing right from that same fitting from the perspective of the viewer. "Horizontal" or "horizontal orientation" describes that which is in a plane extending from left to right and aligned with the horizon. "Vertical" or "vertical orientation" describes that which is in a plane that is angled at 90 degrees to the horizontal.

A pipe fitting placement system and associated methods, systems, devices, and various apparatuses are disclosed herein. In one aspect, the pipe fitting placement system can comprise a pipe fitting placement device and a pipe fitting.

Fluid distribution systems such as used for the distribution of water, natural gas, and other raw fluid materials can comprise pipes extending long distances. It is possible that, over time in the process of maintaining, reconfiguring, and replacing the systems, sections of pipe can become isolated from other sections of pipe or from the fluid source and, absent accurate records (that are definitely known to be accurate), it can be unclear whether any particular section of pipe is in use—and pressurized—and to what degree. It can therefore be desirable to reliably identify whether any particular section of the pipe contains a fluid and is pressurized.

FIG. 1 shows a perspective view of a pipe fitting placement system 50, which can fulfill at least the purposes disclosed herein. As shown, the pipe fitting placement system 50 can comprise a pipe 80, a pipe fitting 150, and a pipe fitting placement device 100 configured to hold the pipe fitting 150 against and in contact with the pipe 80. The pipe 80 can define a pipe axis 81, an outer surface 82 and an inner surface 83. The pipe fitting 150 can define a fitting axis 151, an outer surface 152, and an inner surface 153 (shown in FIG. 3) defining a bore 158 (shown in FIG. 3). The pipe fitting 150, which is further described below, can comprise a body 160. The body 160 can comprise a first portion 161, and the body 160 can comprise a second portion 162. Either of the first portion 161 and the second portion 162 can define threads, which are also described below.

The pipe fitting placement device 100 can comprise a fitting holder 110. The pipe fitting placement device 100 can further comprise a clamp 120. The fitting holder 110 can itself comprise a bar 130 and a saddle 140. In some aspects, as shown, the bar 130 can be sized and otherwise configured to receive the pipe fitting 150. For example, as shown, at least a portion of the pipe fitting 150 can be received within a fitting bore 137, which can be defined in the bar 130 proximate to a first end 135 of the bar 130. In some aspects, as shown, the bar 130 can be sized and otherwise configured to receive the clamp 120. For example, as shown, a portion of the clamp 120 such as a fastener 129 can be received within a clamp bore 138, which can be defined in the bar 130 between the first end 135 of the bar 130 and a second end 136 of the bar 130. The fastener 129 or the clamp 120 more generally can define a clamp axis 121. In some aspects, as shown, the bar 130 can be sized and otherwise configured to receive the saddle 140. For example, as shown, a portion of the saddle 140 can be received within a saddle cutout 139, which can be defined in the bar 130 proximate to the second end 136 of the bar 130. The saddle 140 can comprise and can be fixed to the bar 130 with a fastener 149. Any of the fitting bore 137, the clamp bore 138, and the saddle cutout 139 can be a circular or non-circular hole, recess, notch, or cutout configured to receive at least a portion of the pipe fitting 150, the clamp 120, and the saddle 140, respectively. The fitting holder 110, and, more specifically, the bar 130, can further define a handle bore or, more generally, a handle cutout 134, which can facilitate lifting of the bar 130 and the fitting holder 110. In some aspects, the bar 130 need not define any one of the clamp bore 138, the handle cutout 134, and the saddle cutout 139. In some aspects, any of the fitting bore 137, the clamp bore 138, the handle cutout 134, and the saddle cutout 139 can extend to an edge of the bar 130 and not be offset from each edge of the bar 130.

Figure 2:
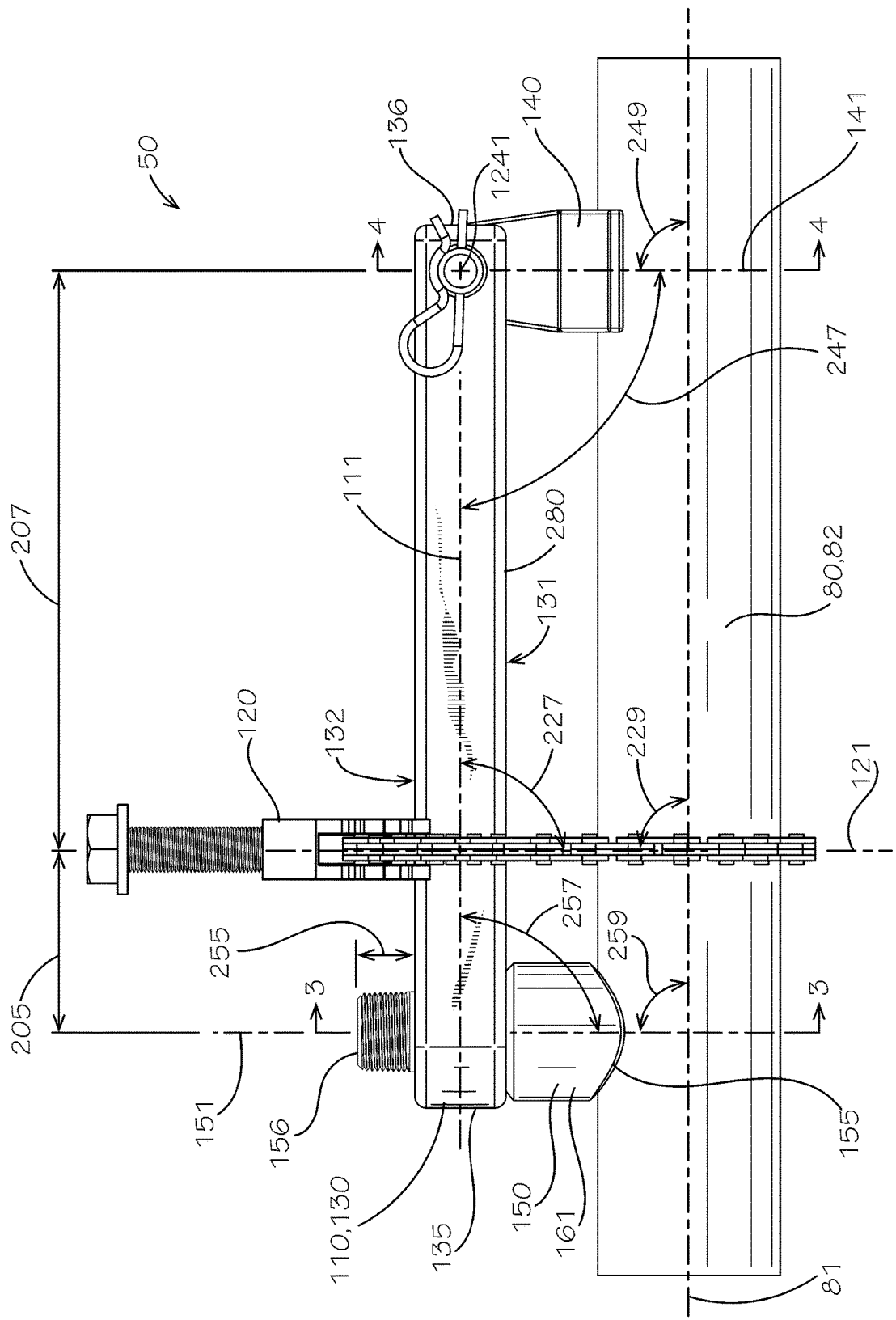
FIG. 2 is a side view of the pipe fitting placement system of FIG. 1.

FIG. 2 is a side view of the pipe fitting placement system 50. As shown, the pipe fitting 150 and the saddle 140 can be positioned at least in part between the outer surface 82 of the pipe 80 and the bar 130, which is shown holding the pipe fitting 150 and the saddle 140 against the outer surface 82 of the pipe 80. More specifically, a lower surface 131 of the bar 130 can be offset from the pipe 80 by, for example and without limitation, the first portion 161 of the body 160 of the pipe fitting 150 and a portion of the saddle 140. An opening 280 can thereby be defined between the bar 130 and the pipe 80. In some aspects, the bar 130 or a portion thereof such as an upper surface 132 or the lower surface 131 can be parallel to the pipe axis 81. In other aspects, the bar 130 or a portion thereof can be angled with respect to the pipe axis 81, either as a feature of the pipe fitting placement system 50 or due to non-ideal conditions surrounding work on the pipe 80 raising one end of the bar 130 higher than the other. In any case, the bar 130 can define a horizontal axis 111, which can extend through or intersect with a saddle pivot axis 1241 (shown in FIG. 12), which can be a hinge point or hinge axis.

The pipe fitting 150 can define a first end 155 proximate to and in contact with the pipe 80. The pipe fitting 150 can further define a second end 156 distal from the first end 155.

The second end 156 can extend through the bar 130 and beyond the upper surface 132 in a direction away from a portion of the pipe 80 against which the pipe fitting 150 is in contact. The second end 156 can be offset from the upper surface by an offset distance 255, which can accommodate equipment (not shown) for drilling a hole 88 (shown in FIG. 3) in the pipe 80 and also maintaining pressure of and/or accessing any fluid inside the pipe 80.

The clamp 120 can be positioned between the first end 135 of the bar 130 and the second end 136 of the bar 130 and can be aligned with the clamp bore 138 (shown in FIG. 1) and the clamp axis 121. More specifically, the clamp 120 and the clamp axis 121 can be offset from the fitting axis 151 by an offset distance 205, and the clamp 120 and the clamp axis 121 can be offset from a saddle axis 141 defined by the saddle 140 by an offset distance 207. In some aspects, as shown, the offset distance 205 can be less than the offset distance 207 to increase a force (not shown) with which the bar 130 can hold the pipe fitting 150 against the pipe 80 and an equal reaction force with which the stationary pipe 80 can effectively push back. Increasing the offset distance 207—and thereby also the force and reaction force between the pipe fitting 150 and the pipe 80—can facilitate increased friction and ultimately an improved seal between the pipe fitting 150 and the pipe 80. Such an improved seal can decrease or eliminate the risk that the pipe fitting 150 will move during drilling of the hole 88 or other operations performed on the pipe 80 with the pipe fitting placement system 100 installed. At the same time, it can be beneficial for the offset distance 205 to allow for adequate space between the clamp 120 and any equipment attached to the pipe fitting 150 and to leave clearance for welding around the full perimeter of the pipe fitting 150, which may be desirable if the pipe 80 is found to be pressurized or otherwise contain a fluid. While the reaction force between the saddle 140 and the pipe 80 can be less when the clamp 120 is positioned closer to the pipe fitting 150 than to the saddle 140, the saddle 140 can nonetheless fix the position of the second end 136 of the bar 130 on the pipe 80 and thereby also facilitate a good seal between the pipe fitting 150 and the pipe 80 by preventing movement of the bar 130 proximate to the second end 136.

A portion of the pipe fitting 150 such as the fitting axis 151 can be angled with respect to a horizontal axis 111 of the fitting holder 110 by an angle 257, and a portion of the pipe fitting 150 such as the fitting axis 151 of the pipe fitting 150 can be angled with respect to the pipe axis 81 of the pipe 80 by an angle 259. Similarly, a portion of the clamp 120 such as the clamp axis 121 can be angled with respect to the horizontal axis 111 of the fitting holder 110 by an angle 227, and a portion of the clamp 120 such as the clamp axis 121 can be angled with respect to the pipe axis 81 of the pipe 80 by an angle 229. Similarly, a portion of the saddle such as the saddle axis 141 can be angled with respect to a horizontal axis 111 of the fitting holder 110 by an angle 247, and a portion of the saddle such as the saddle axis 141 can be angled with respect to the pipe axis 81 of the pipe 80 by an angle 249. The saddle 140 can effectively swivel about the saddle pivot axis 1241 to maximize contact with the outer surface 82 of the pipe 80. In some aspects, each of the angles 227, 229, 247, 249, 257, 259 can measure 90 degrees or approximately 90 degrees. In other aspects, including when the bar 130 is angled with respect to the pipe axis 81, one or more of the angles 227, 229, 247, 249, 257, 259 can be a non-90-degree angle, in which case the angle 227 can be complimentary to angle 229, angle 247 can be complimentary to angle 249, and angle 257 can be complimentary to angle 259. In such case the geometry of each of the pipe fitting 150, the clamp 120, and the fitting holder 110 including the bar 130 and the saddle 140 can be adjusted to maintain a seal or at least a maximum contact surface area between each and with mating parts such as the pipe 80.

Figure 3:
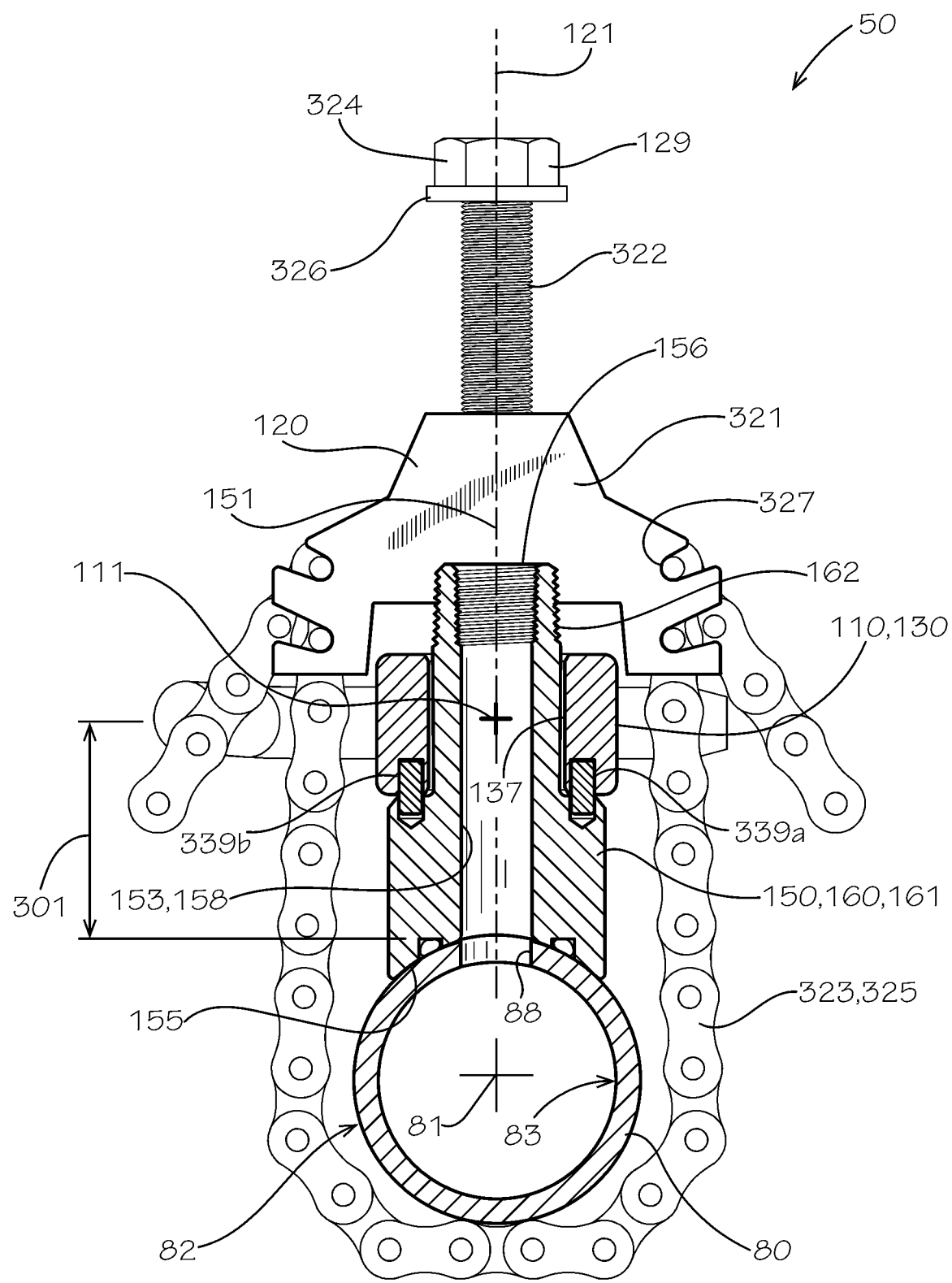
FIG. 3 is a sectional view of the pipe fitting placement system of FIG. 1 taken along line 3-3 of FIG. 2.

FIG. 3 is a sectional view of the pipe fitting placement system 50. As shown, the clamp axis 121 and the fitting axis 151 can be aligned with each other in the view shown and intersect the pipe axis 81. The pipe fitting 150 can be in contact with the outer surface 82 of the pipe 80 and an O-ring 900 (shown in FIG. 9) can be positioned therebetween to facilitate a seal therebetween, whether or not a shape of a pipe mating surface 651 (shown in FIG. 6) of the pipe fitting 150 matches a shape of the pipe 80. As shown, a shape such as defined by a radius R150 (shown in FIG. 6) of the pipe fitting 150 can match a shape such as defined by a radius R80 (shown in FIG. 4) of the pipe 80 to separately facilitate a seal therebetween, whether or not the O-ring 900 is present.

The bar 130 can receive and be coupled to the pipe fitting 150. For example and without limitation, the pipe fitting 150 can received within the fitting bore 137 and the bar 130 can be coupled to the pipe fitting 150 with stops 339a,b, which can be pins. As shown, a gap defined between the fitting bore 137 of the bar 130 and the pipe fitting 150 can be large enough to receive without interference or resistance the pipe fitting 150 but can be small enough to prevent passage of the first portion 161 of the body 160 of the pipe fitting 150. In some aspects, the stops 339a,b can be separately formed components—and, for example and without limitation, the pins shown—extending into bores defined in each of the bar 130 and the pipe fitting 150. In other aspects, the stops 339a,b can be geometry such as a shoulder or tab formed integrally into the bar 130, the pipe fitting 150, or both the bar 130 and the pipe fitting 150. In some aspects, only a single stop 339a,b may be used to prevent rotation of the pipe fitting 150 with respect to the bar 130. In some aspects, no stop 339a,b is necessary and the mating contact with the pipe 80 and the bar 130 and the pressure by which the pipe fitting 150 is held therebetween is sufficient to prevent rotation of the pipe fitting 150 with respect to the bar 130.

The pipe fitting 150 and the bar 130 can define an offset distance 301, which can be measured between the horizontal axis 111 and a tangent line of the outer surface 82 of the pipe 80. As shown, the bore 158 of the pipe fitting 150 can define a straight opening extending from the second end 156 to the first end 155 of the pipe fitting 150, which can be configured to receive a drilling bit (not shown) or can allow measurement and/or passage of fluid therethrough, as well as through the hole 88 of the pipe 80.

The clamp 120 can comprise the fastener 129, a clamp fitting 321, and a band 323. The fastener 129 can comprise a shank 322, a head 324, and a washer 326, which can be separate from or formed monolithically with the head 324. The head 324 can facilitate rotation of the fastener 129 with a compatible tool (not shown) such as a driver or torque wrench. The washer 326 can stop and thereby limit travel of the tool with respect to the head 324 so that the tool remains engaged with the head 324. A portion of the fastener 129 such as the shank 322 of the fastener can be threadably received within a bore defined within the clamp fitting 321 and by rotation cause movement of the clamp fitting 321 with respect to the fastener 129. In some aspects, such as when formed into a chain as shown, the band 323 can comprise links 325 or otherwise be formed from separate components. As shown, the chain can specifically be a roller chain. In other aspects, the band 323 can be formed monolithically from a single material. In some aspects, pins 327 of the band 323 can be positioned inside slots defined in the clamp fitting 321 and upon tightening of the clamp 120 can hold opposite or distal ends of the band 323 stationary with respect to the clamp fitting 321 while the band 323 is pulled taught around the pipe 80 to press the bar 130 against the pipe fitting 150 and the pipe fitting 150 against the pipe 80. A length or diameter of any of the pins 327 can be adjusted as needed to accommodate lower or higher clamping forces from the clamp 120. In some aspects, it can be desirable for the clamp to apply a force only along the clamp axis 121 to reduce the risk that a position of the pipe fitting 150 may shift on the pipe 80.

In other aspects, including when the band 323 is formed monolithically from a single material, the pins 327 are not necessary. For example and without limitation, the band 323 can be a metal strap such as can be used to secure a crate, in which case ends of the band 323 can be secured to the claim fitting or to itself or at least tightened and clips or buckles can be temporarily or permanently used to maintain the position of the strap. In some aspects, without even the need for the fastener 129 or the clamp fitting 321, a separate tool can be used to tighten the fitting holder 110 against the pipe fitting 150 and the pipe 80 without the clamp 120 necessarily being integral with the pipe fitting placement device 100 or otherwise interacting with the fitting holder 110.

In some aspects, the band 323 need not wrap around the pipe 80. For example and without limitation, the clamp 120 and, more specifically, the clamp fitting 321 can be secured or adjustably secured to a stationary object other than the pipe 80 and the clamp 120 nonetheless be able to apply downward pressure to the pipe. It can be beneficial, however, to ensure that the pipe fitting 150 and the saddle 140 do not shift from the desired position on the pipe 80 by directing the force from the clamp 120 downwards onto and through the bar 130 while minimizing any horizontal components of such force. As shown, when the band 323 wraps around the pipe 80, increased friction resulting from increased force acting on the bar 130 from the clamp 120 can naturally limit or eliminate any shifting of the pipe fitting 150 or the saddle 140 on the pipe 80.

Figure 4:
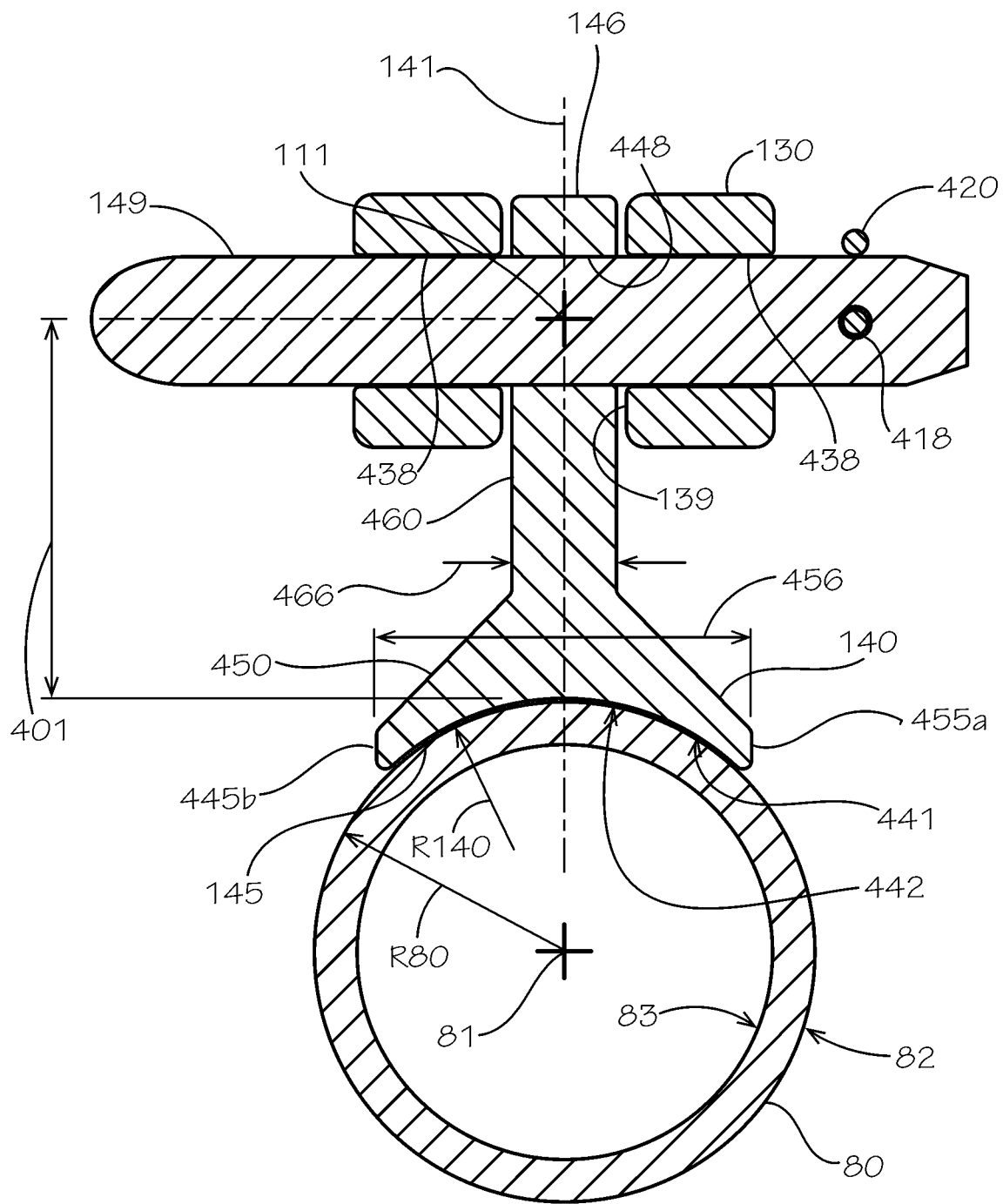
FIG. 4 is a sectional view of the pipe fitting placement system of FIG. 1 taken along line 4-4 of FIG. 2.

FIG. 4 is a sectional view of the pipe fitting placement system 50. The saddle 140 and the bar 130 can define an offset distance 401, which can be measured between the horizontal axis 111 and a tangent line of the outer surface 82 of the pipe 80. Where the bar 130 is parallel to the pipe 80, the aforementioned offset distance 301 (shown in FIG. 3) and the offset distance 401 can be equal to each other.

The saddle 140 can be in contact with the outer surface 82 of the pipe 80. In some aspects, as shown, a shape of a pipe mating surface 441 of the saddle 140 can match a shape of the pipe 80. More specifically, a shape such as defined by a radius R140 of the saddle 140 can match a shape such as defined by the radius R80 of the pipe 80 to facilitate a wide contact surface area 442. Where the contact surface area 442 is increased, the force resulting from a tightening of the clamp 120 against the bar 130 can be spread across the entire surface area and the stresses experienced in the pipe 80 at any one point on the outer surface 82 or the inner surface 83 will be lessened. Because the force resulting from the tightening of the clamp 120 can be significant—for example and without limitation, up to about 8,000 pounds or more of force—and also because pipe material characteristics due to construction and/or age of the pipe 80 can vary, lowering the localized stress experienced in walls of the pipe 80 and eliminating localized stress concentrations can be beneficial.

When determining the force appropriate when tightening the clamp 120, it can be beneficial to consider at least the potential maximum pressure of any fluid within the pipe 80 as well as the force or forces incident to drilling the hole 88 in the pipe 80, each of which can act to lift the pipe fitting 150 away from the pipe 80 if large enough individually or in combination. For example only, initial drilling of the pipe 80 to begin definition of the hole 88 can allow fluid from within the pipe 80 to enter through the hole 88 into the bore 158 of the pipe fitting 150. When the pipe fitting 150 is capped with equipment for drilling the pipe 80 and/or handling any fluid that exits the pipe 80 through the hole 88, the pressure can develop and can potentially come to equal or at least approach the pressure inside the pipe 80. While the hole 88 is still being drilled, a process which can take time depending on a thickness of a wall of the pipe 80, the size of the pipe fitting 150, a sharpness and other characteristics of the drilling bit, and other factors, this pressure can act against the outer surface 82 of the pipe 80 that remains to be drilled and against the pipe fitting 150 and anything attached to it. When, for example and without limitation, a fluid pressure of 1,200 pounds per square inch (psi) develops inside the pipe fitting 150 and acts against even a projected surface area—in a plane perpendicular to the fitting axis 151—of 4 square inches, a force of 4,800 psi can result. When the fluid pressure, surface area, or incident drilling forces are increased, higher forces can naturally result.

In some aspects, as shown, the maximum expected forces can be estimated using the above approach or any desirable approach and the clamp 120 tightened to a degree corresponding to such forces. For example, through simple testing in a laboratory a range of forces based on the expected forces on the pipe fitting 150 can be applied to the bar 130 through the clamp 120 and the applied force measured through measurement of the surface stresses and/or deflection of the bar 130 using strain gages or other measuring tools. A torque for tightening the fastener 129 that corresponds to the applied forces can be measured with a torque measurement tool, and a table or formula created for use by technicians in the field. Adjustments can be made as desired for varying conditions or worst-case conditions can be used each time. In other aspects, the force believed to be necessary in particular environments can be estimated and the actual applied force measured in the operational environment.

The saddle 140 can comprise a first portion 450 disposed or positioned proximate to a first end 145 of the saddle 140 and a second portion 460 disposed distal from the first end 145 and proximate to a second end 146. The first portion 450 can comprise legs 455a,b, which can extend away from the saddle axis 141. As shown, each of the legs 455a,b and the first portion 450 overall can be tapered, and each of the legs 455a,b can be in part angled with respect to the saddle axis by a 90-degree angle or, as shown, a non-90-degree angle. The first portion 450 can define a transverse width 456, and the second portion 460 can define a transverse width 466. The first portion 450 can define the transverse width 456 sufficient to maximize the contact surface area 442 and thereby spread out the force exerted on the pipe 80 by the saddle 140. An end diameter D150 (shown in FIG. 8) of the pipe fitting 150 can be similarly set and can be equal to the transverse width 456. In some aspects, as shown, the second portion 460 can define a constant transverse width 466 from the second end 146 to an end of the second portion 460 distal from the second end 146, which can facilitate rotation of the saddle 140 within the saddle cutout 139. Similarly, the saddle cutout 139 can define a constant width from the upper surface 132 to the lower surface 131 of the bar 130 or, optionally, up to any edge treatments applied adjacent thereto. Each of the transverse width 456 and the transverse width 466 can be measured in a direction perpendicular to the pipe axis 81 and to the saddle axis 141.

In some aspects, as noted above, the saddle 140 can be joined to the bar 130 with the fastener 149. More specifically, the saddle 140—and, more specifically, the second portion 460 of the saddle 140—can extend into and through the saddle cutout 139. The fastener 149 can itself extend through a pivot bore or pivot bores 438 defined in the bar 130 and through a pivot bore 448 defined in the saddle 140—and, more specifically, the second portion 460 of the saddle 140. In some aspects, after assembly of the fastener 149 to the bar 130 and to the saddle 140, a fastener 420 can assemble to the fastener 149. The fastener 149 can be any fastener including that defining a shaft such as, for example and without limitation, a pin or a bolt. The fastener 420 can itself be any fastener including that defining a shaft such as, for example and without limitation, a pin or a bolt. More specifically, as shown, the fastener 420 can be a cotter pin. More specifically, either of the fastener 149 or the fastener 420 can be any one of a variety of pins such as, for example and without limitation, a split pin, a hairpin clip, a split ring, a quick-release pin (such as that comprising a spring-loaded ball lock), a spring pin, or a threaded stud, with or without assembly to additional fasteners such as a matching nut or other pin. The fastener 149 can define a bore 418, which can receive and can be configured to receive a spring-loaded ball (when, for example, the fastener 149 is a quick-release pin as previously defined) or another fastener such as the fastener 420. In other aspect, no fastener is needed to join the saddle 140 to the bar 130 and yet the bar 130 can allow rotation of the saddle 140 about the saddle pivot axis 1241. For example and without limitation, a curved surface or V-shaped surface on the bar 130 and facing the saddle 140 can hold captive a curved surface or V-shaped surface on the saddle while still allowing rotation of the saddle about the saddle pivot axis 1241 defined by the surfaces.

Figure 5:
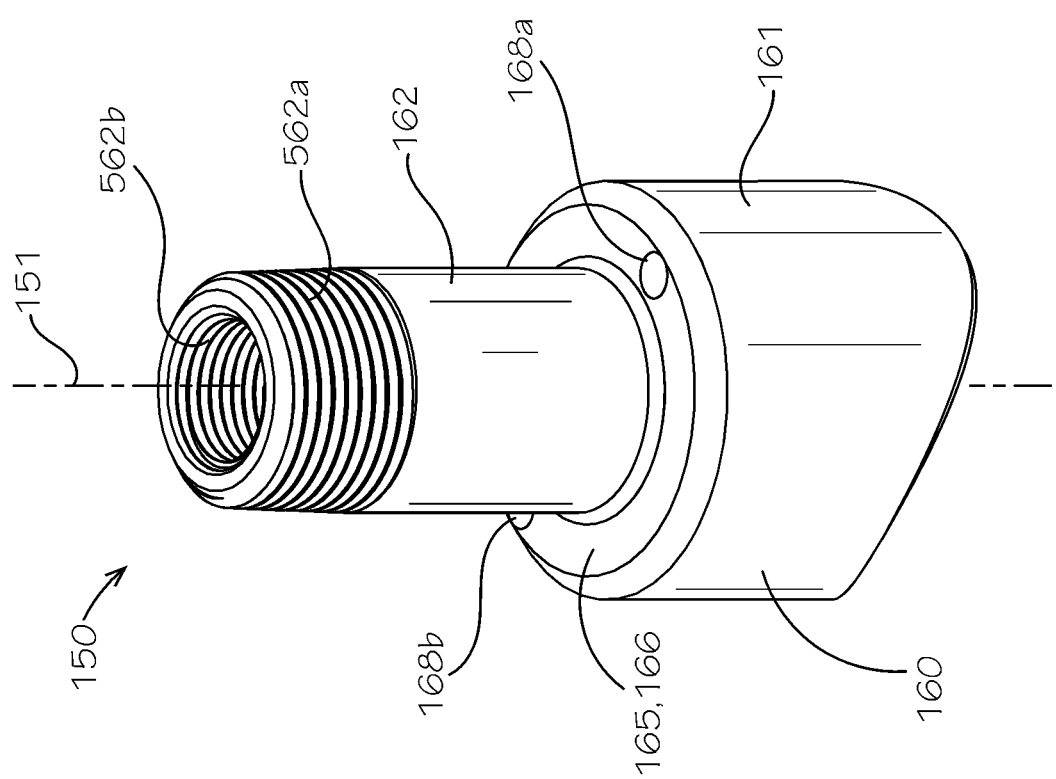
FIG. 5 is a perspective view of the pipe fitting of FIG. 1.

FIG. 5 is a perspective view of the pipe fitting 150 of the pipe fitting placement system 50. The pipe fitting 150 can define a shoulder 165 defining a shoulder surface 166 against which the bar 130 can push when tightened. The pipe fitting 150 and, more specifically, the shoulder 165 can define stops 168a,b, which can be sized to receive the stops 339a,b (shown in FIG. 3). In some aspects, as shown, the stops 168a,b can be bores or recesses defined in a portion of the pipe fitting 150 such as, for example and without limitation, the shoulder 165 and the shoulder surface 166. Either of the stops 168a,b can be a slot defined in the pipe fitting 150 to engage the stops 339a,b. In some aspects, the geometry of the stops 168a,b can either match or complement the geometry of the stops 339a,b. For example and without limitation, each of the stops 168a,b can define a shoulder, tab, notch, or similar geometry extending radially, transversely, axially, or circumferentially from or defined in the pipe fitting 150 and configured to contact the stops 339a,b, which can extend from or be defined in the bar 130 and can similarly define a complementary shoulder, tab, notch, or similar geometry. In some aspects, only a single stop 339a,b and a single stop 168a,b can be used to prevent rotation of the pipe fitting 150 with respect to the pipe 80. In some aspects, only a single stop 339a,b or a single stop 168a,b can be used to prevent rotation of the pipe fitting 150 with respect to the pipe 80. In some aspects, either of the stops 168a,b can be positioned 90 degrees about the fitting axis 151 from the positions shown or in other angular positions. In some aspects, a non-circular outer shape of the pipe fitting 150 can be captured by the bar 130 or a portion thereof such as the fitting bore 137. In some aspects, no stop 168a,b is necessary to prevent rotation of the pipe fitting 150 with respect to the pipe 80.

In some aspects, as shown, the stops 168a,b in the pipe fitting 150 can be designed to fit tightly around the respective stops 339a,b. In other aspects, the stops 168a,b can be larger than the stops 339a,b. The latter condition can facilitate or allow for rotation of the bar 130 with respect to the pipe fitting 150 by adjustment of the angle 257 (shown in FIG. 2) from 90 degrees, which can result when the relative height of the pipe fitting 150 (or, for example, the offset distance 301) is different than the corresponding height of the saddle (or, for example, the offset distance 401) or when a pipe has a variable diameter or surface variations where the pipe fitting placement device 100 is installed. In other aspects, any or all of the stops 339a,b, the stops 168a,b, and the should 165 can be angled to facilitate a non-90-degree angle 257. In other aspects, corresponding or mating surfaces of the bar 130 and the pipe fitting 150—for example, the lower surface 131 of the bar 130 and the shoulder surface 166 of the pipe fitting 150—could be curved or rounded and additional clearance provided between the fitting bore 137 and the pipe fitting 150 to facilitate the even transfer of force between the respective surfaces even if the angle 257 is a non-90-degree angle.

The pipe fitting 150 can define external threads 562a or internal threads 562b or, as shown, both of the external threads 562a and the internal threads 562b, to facilitate connections with equipment for drilling, measuring, monitoring, or otherwise interacting with the pipe 80 and any fluid therein. As shown, the external threads 562a and the internal threads 562b can be defined in the second portion 162 of the body 160 of the pipe fitting 150.

Figure 6:
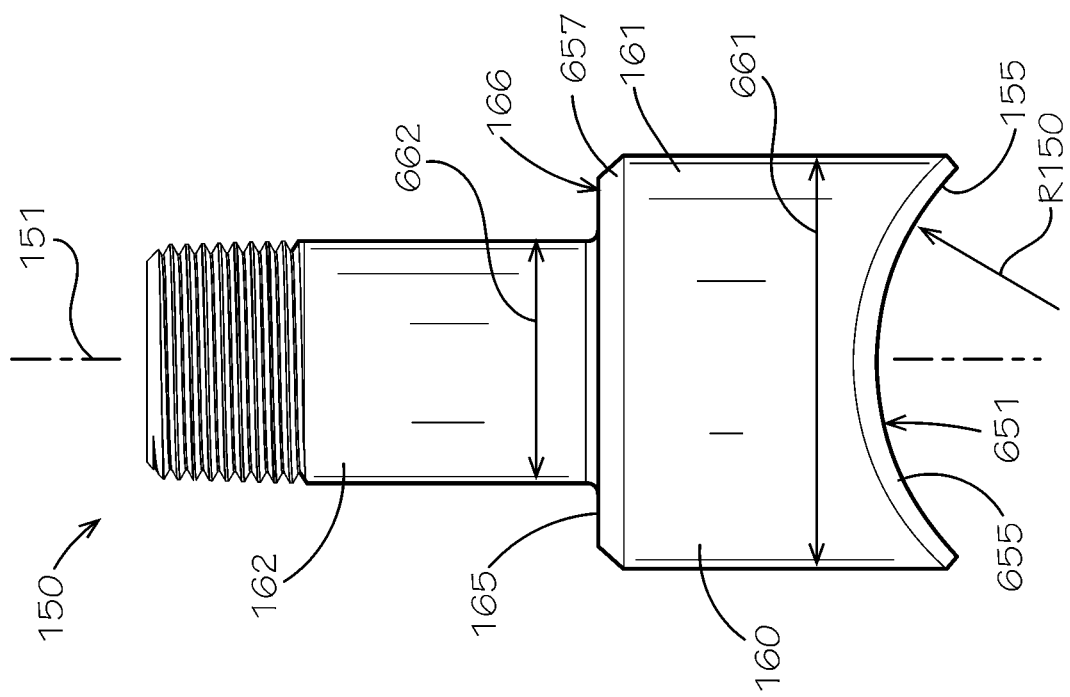
FIG. 6 is a front view of the pipe fitting of FIG. 5.
Figure 7:
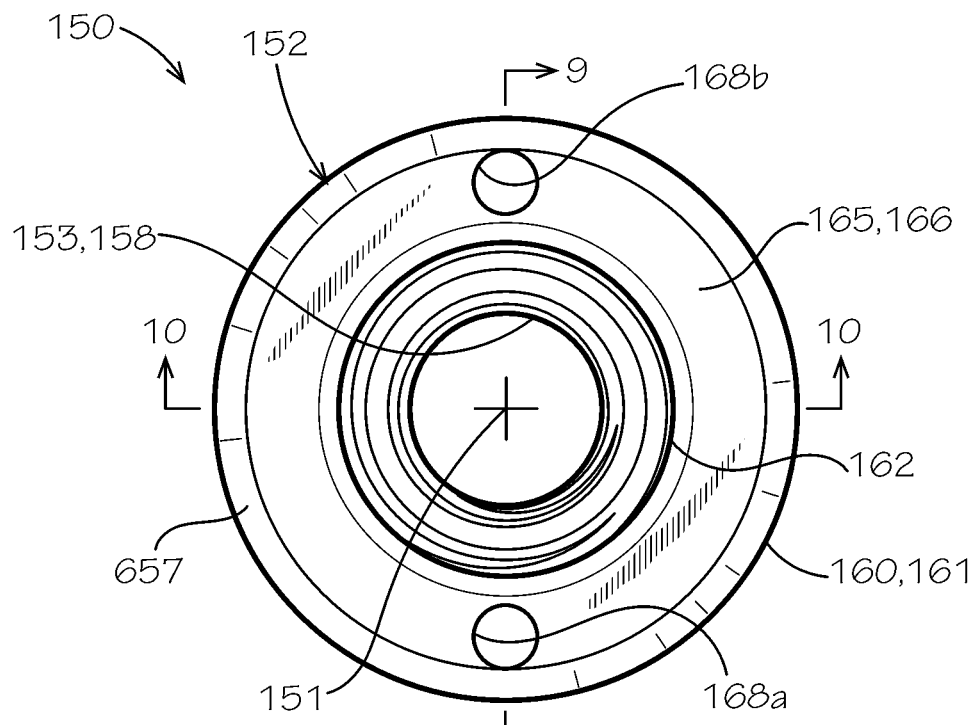
FIG. 7 is a top view of the pipe fitting of FIG. 5.
Figure 8:
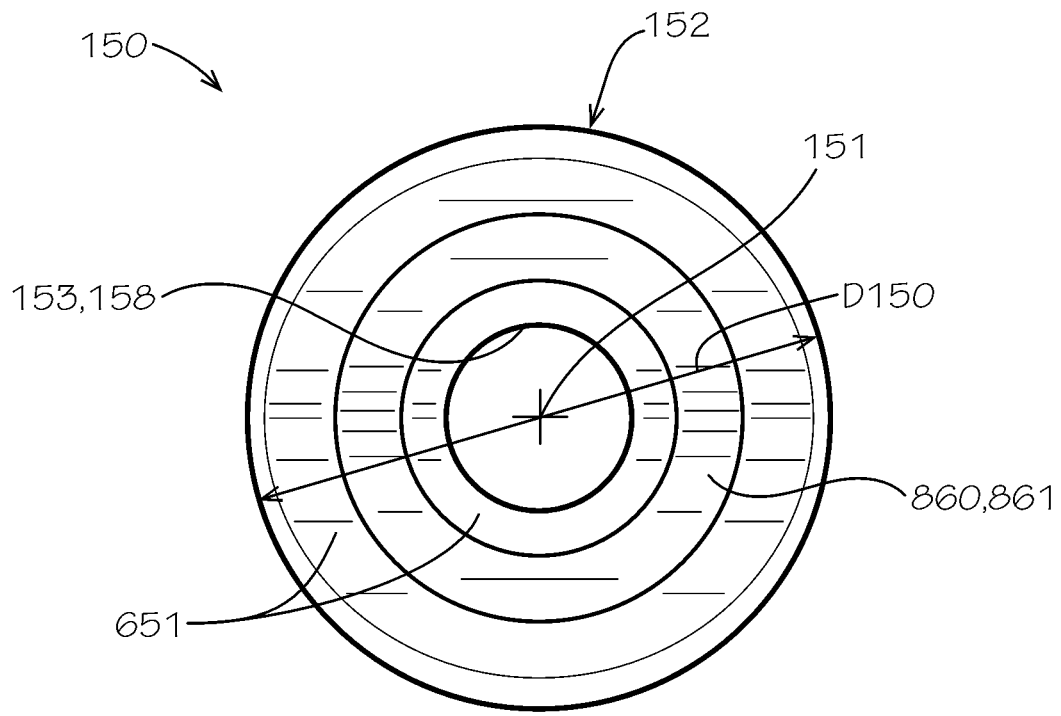
FIG. 8 is a bottom view of the pipe fitting of FIG. 5.

FIGS. 6-8 show front, top, and bottom views of the pipe fitting 150. As shown in FIG. 6, an outside diameter 661 of the first portion 161 of the body 160 of the pipe fitting 150 can be greater than an outside diameter 662 of the second portion 162 of the body 160 to ensure that the pipe fitting 150 is held captive by the bar 130 during operation through forces applied by the bar 130 to, for example, the shoulder 165 of the pipe fitting 150. As shown, either of the outside diameter 661 and the outside diameter 662 can be constant in an axial direction for all or a part of the respective portions 161, 162 of the pipe fitting 150. The outside diameter 661 can be equal to the end diameter D150. The pipe fitting 150 can define an edge treatment 655 such as a radius or, as shown, a chamfer proximate to the first end 155 of the pipe fitting 150. Similarly, the pipe fitting 150 can define an edge treatment 657 such as a radius or, as shown, a chamfer proximate to and even partially defining the shoulder 165. Either of the edge treatment 655 or the edge treatment 657 can, for example and without limitation, ensure the removal of burrs and sharp edges or facilitate or guide welding between the pipe fitting 150 and the pipe 80 by the formation of a slight groove or channel therebetween, which can facilitate the positioning of any welding rod and increase the surface area for welding. As shown in the edge treatment 655 in FIG. 8 and by a comparison of the same edge treatment 655 in FIGS. 9 and 10, either of the edge treatment 655 or the edge treatment 657 can vary in size over its length.

As shown in FIG. 8, the pipe mating surface 651 of the pipe fitting 150 can define a groove 860 defining a groove surface 861. The groove 860 can be sized and otherwise configured to receive the O-ring 900 (shown in FIG. 9). As shown, the groove 860 can be positioned between the bore 158 and the outer surface 152 of the pipe fitting 150 and can also be offset from each of the bore 158 and the outer surface 152. By offsetting the groove 860 form the bore 158, the groove 860—and the O-ring 900 when positioned therein—can avoid interference with or damage from any drilling through the bore 158 into the pipe 80 and also any interference with or damage from any welding of the pipe fitting 150 proximate to the outer surface 152 to secure the pipe fitting 150 to the pipe 80.

Figure 9:
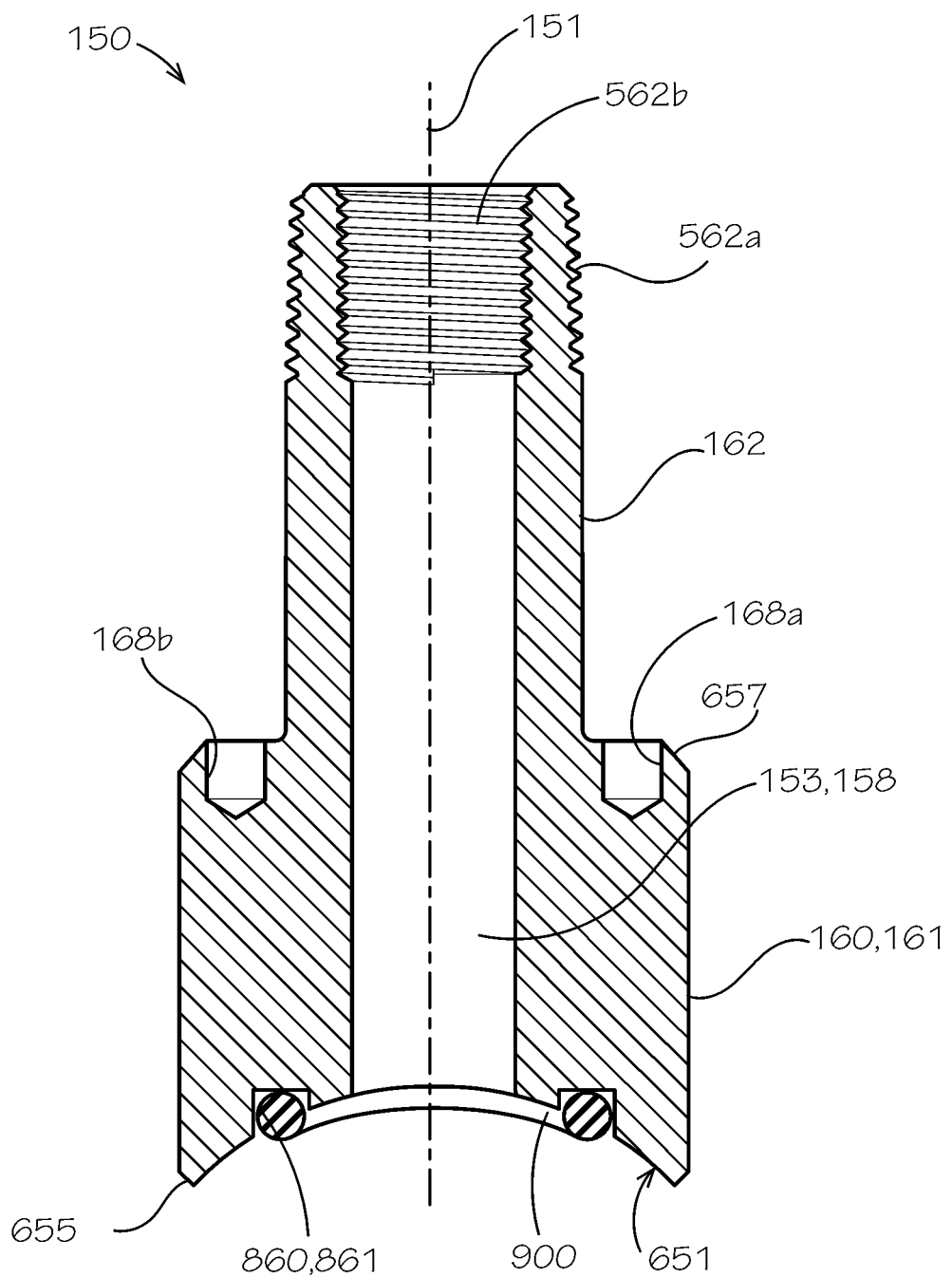
FIG. 9 is a sectional view of the pipe fitting of FIG. 5 taken along line 9-9 of FIG. 7.
Figure 10:
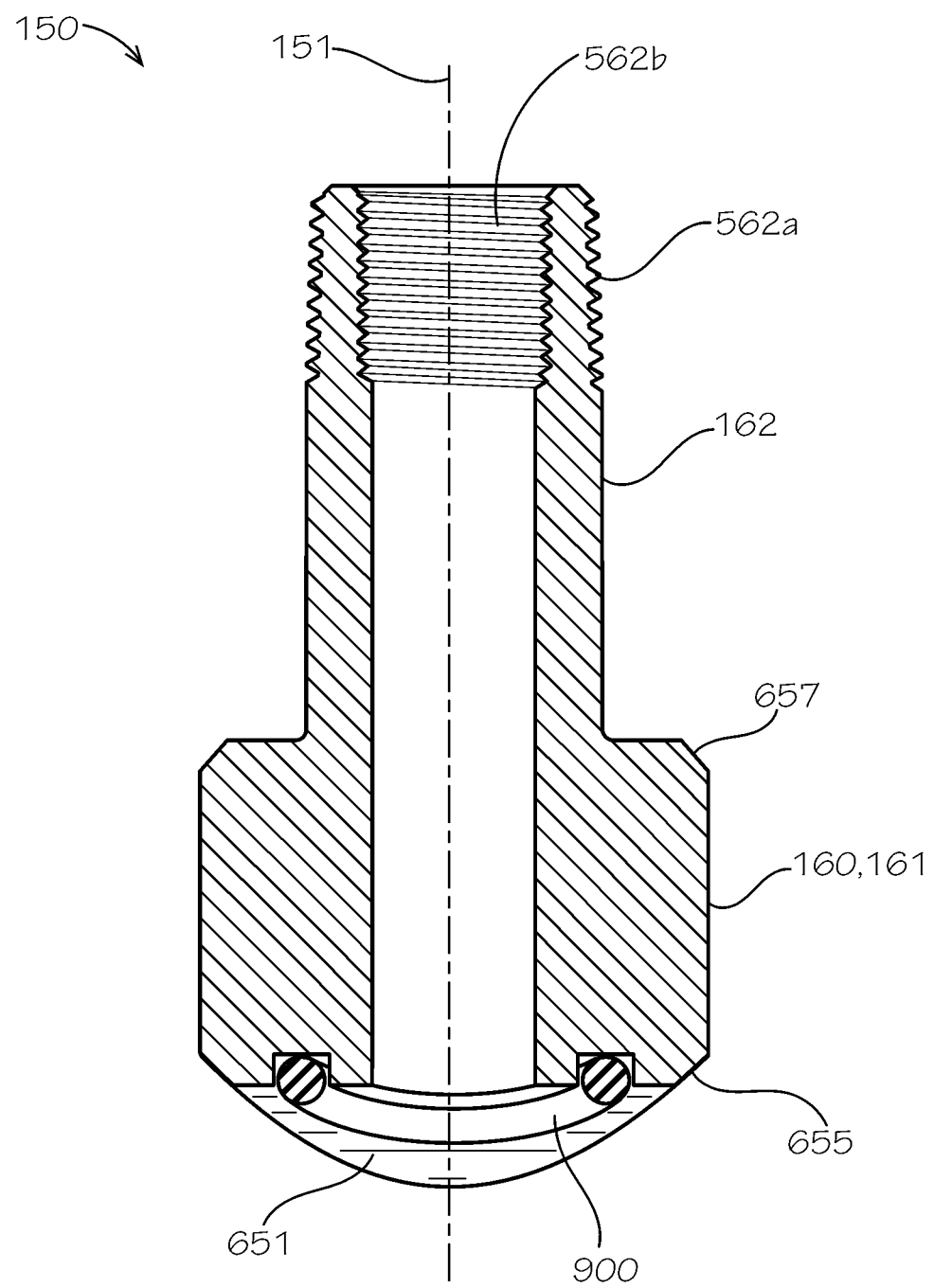
FIG. 10 is a sectional view of the pipe fitting of FIG. 5 taken along line 10-10 of FIG. 7.

FIGS. 9 and 10 are sectional views of the pipe fitting 150. In some aspects, as shown, the groove 860 can form a recess in the pipe mating surface 651 of the pipe fitting 150. In some aspects, as shown, wall portions of the groove 860 at least in part defining the surface 861 of the groove 860 can be parallel to the fitting axis 151, and a bottom portion of the groove 860 at least in part defining the surface 861 of the groove 860 can be perpendicular to the fitting axis 151. In other aspects, the wall portions and bottom portion of the groove 860 and the surface 861 can be otherwise angled with respect to the fitting axis 151. As shown, each of the pipe mating surface 651, the groove 860, and the O-ring 900, including when fully seated in the groove, can have a curved or radiused shape to match the shape of the outer surface 82 (shown in FIG. 3) of the pipe 80 (shown in FIG. 3). When not full seated in the groove, the O-ring 900 have a flat shape. As shown, either or both of the external threads 562*a* or the internal threads 562*b* of the pipe fitting 150 can match any desired standard such as, as shown, external and internal pipe threads, respectively.

Figure 11:
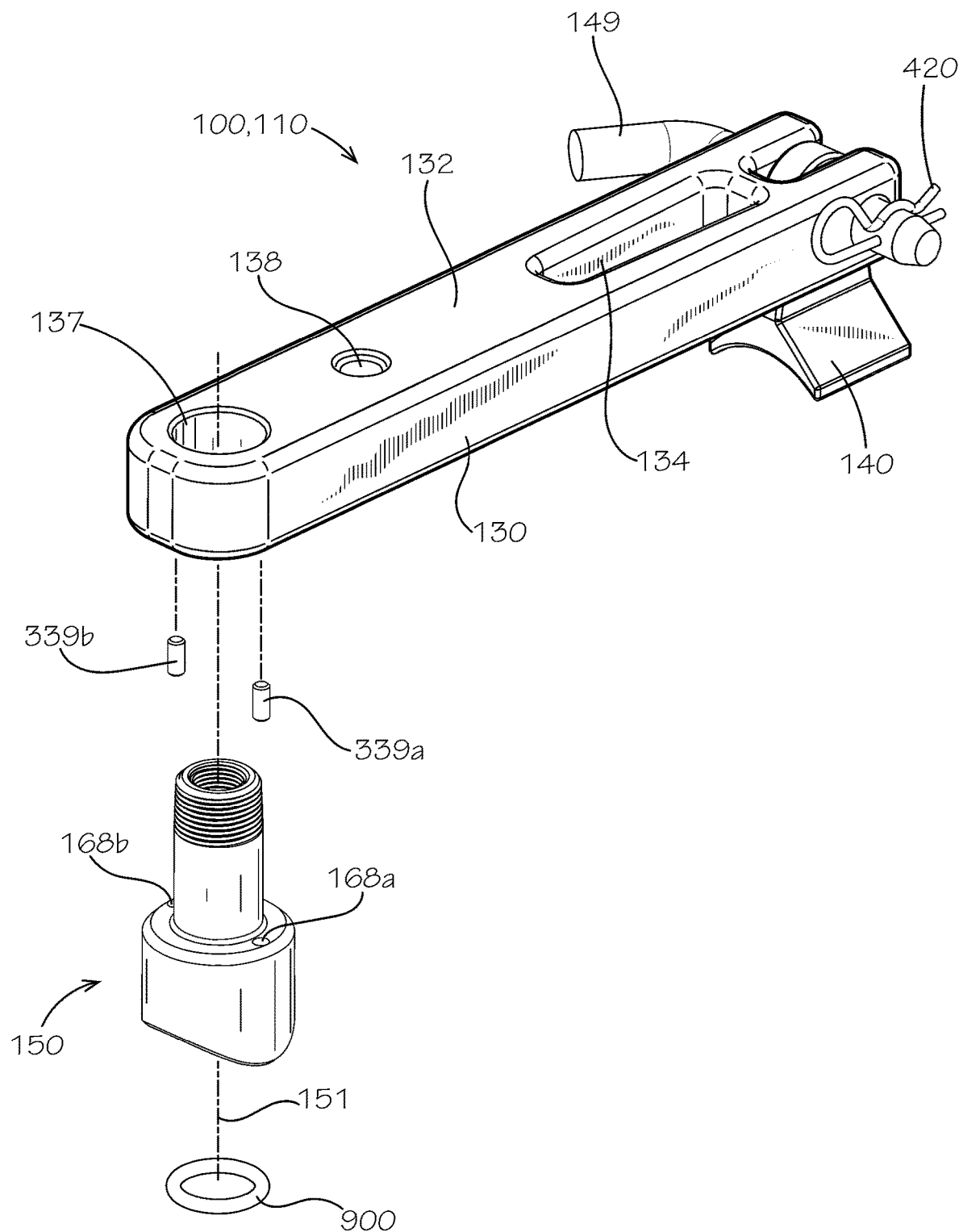
FIG. 11 is an exploded view of a fitting holder of the pipe fitting placement system of FIG. 1 showing also the pipe fitting of FIG. 1.

FIG. 11 is an exploded view of the fitting holder 110 of the pipe fitting placement system 50 showing also the pipe fitting 150. The stops 339*a,b*, which can be inserted in bores (not shown) defined in the bar 130 and in the stops 168*a,b* defined in the pipe fitting, can be optionally stored in the bar 130 or in the pipe fitting 150 when the pipe fitting placement device 100 is not in use. In some aspects, the stops 339*a,b* can be held in the bar 130 or in the stops 168*a,b* with, for example and without limitation, an interference fit or an adhesive. As shown, the clamp bore 138 can define a flat bottom against which the fastener 129 (shown in FIG. 1) of the clamp 120 (shown in FIG. 1) can push when tightened.

Figure 12:
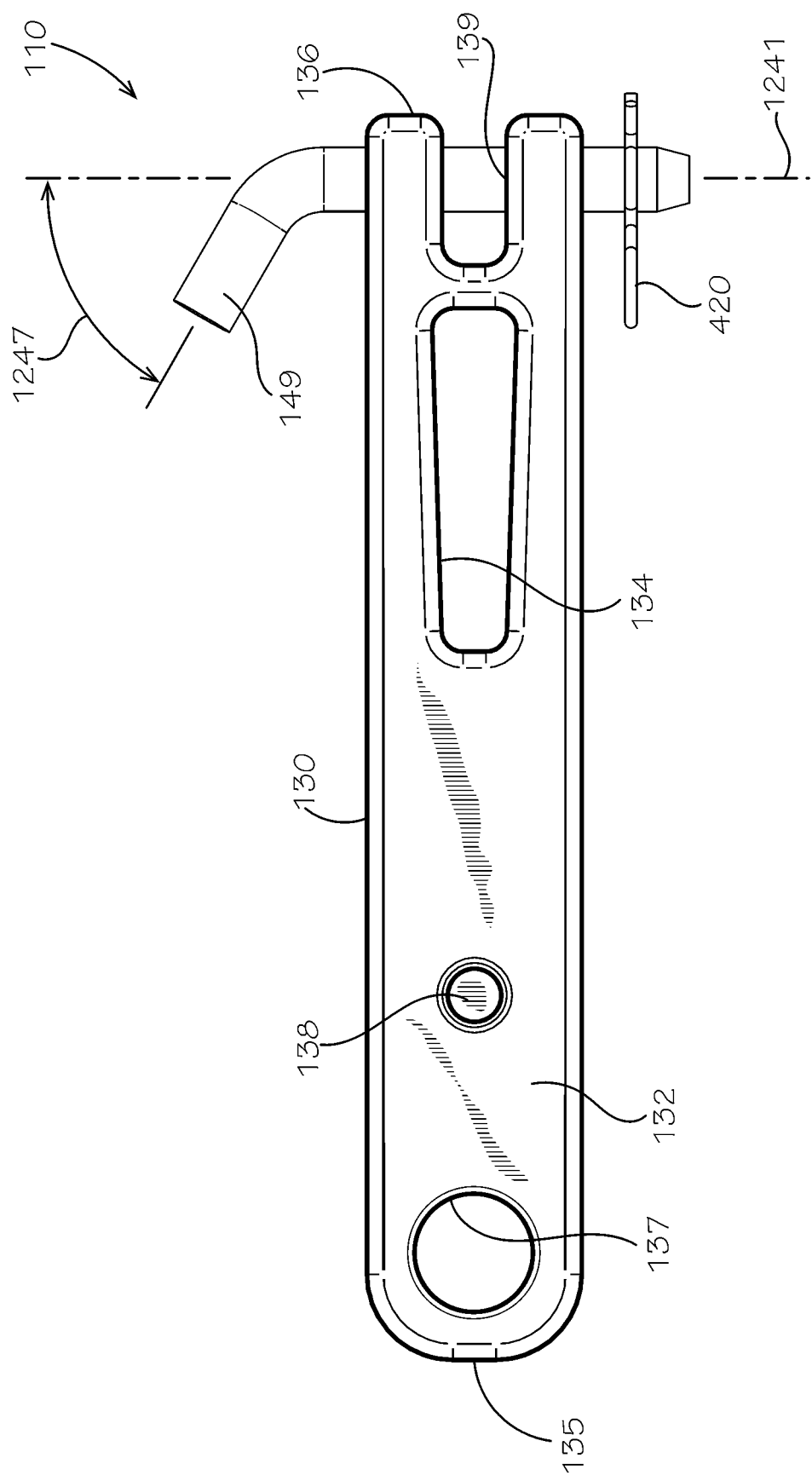
FIG. 12 is a top view of the fitting holder of FIG. 11 with a saddle of the fitting holder removed.

FIG. 12 is a top view of the fitting holder 110 showing the bar 130 and the fastener 149 but with the saddle 140 removed. In some aspects, as shown, the handle cutout 134 can be tapered from one end to the other. Also as shown, the handle cutout 134 can be positioned closer to the second end 136 than to the first end 135 of the bar 130. The aforementioned taper or position of the handle cutout 134 can, for example and without limitation, reduce the weight of the bar 130 by allowing the removal of more material from the bar 130 at an end of the handle cutout 134 positioned further from the clamp bore 138, at which the stresses in the bar 130 are higher and away from which the stresses in the bar 130 are lower. In other aspects, the handle cutout 134 can have a rectangular shape with parallel walls or any other non-rectangular shape. The handle cutout 134 can, for example and without limitation, be further contoured to improve ergonomics in the hands of a user without sacrificing strength characteristics of the bar 130. As shown, a portion of the fastener 149 can be angled with respect to the saddle pivot axis 1241 by an angle 1247.

Figure 13:
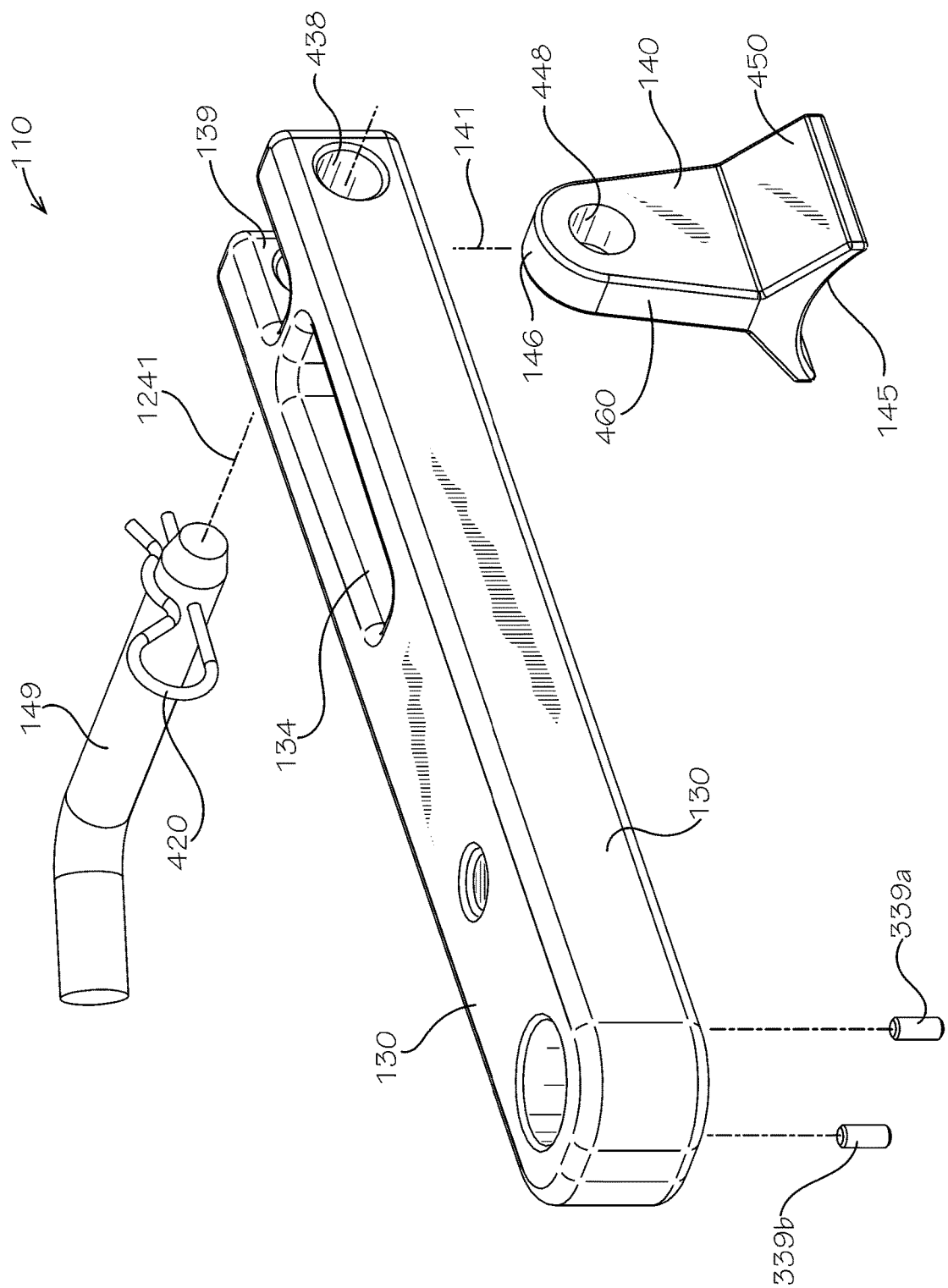
FIG. 13 is an exploded view of the fitting holder of the pipe fitting placement device of FIG. 11.

FIG. 13 is an exploded view of the fitting holder 110. As shown, either of the first portion 450 and the second portion 460 of the saddle 140 can be tapered, at least when viewed from the side along the saddle pivot axis 1241, towards the second end 146 of the saddle 140. This can result in a broader or larger contact surface area 442 at the first end 145 but less weight at the second end 146, where the size of the saddle 140 can be reduced.

The dimensional proportions disclosed herein can be appropriate for certain pipe diameters but can be easily adjusted for larger or smaller pipe diameters. For example, in some aspects, using a common bar 130 (shown in FIG. 1), a common second portion 162 (shown in FIG. 1) for the pipe fitting 150 (shown in FIG. 1), and a common second portion 460 (shown in FIG. 4) for the saddle 140 (shown in FIG. 4), the first portion 161 (shown in FIG. 1) of the pipe fitting 150, the first portion 450 (shown in FIG. 4) of the saddle 140, and the respective radii R150 (shown in FIG. 6) and R140 (shown in FIG. 4) of the pipe fitting 150 and the saddle 140 can be decreased in size for smaller diameter pipes and increased in size for larger diameter pipes.

The pipe 80 can be formed from any one of a variety of standard industry materials including, for example and without limitation, ductile iron or steel. In some aspects, any of the fitting holder 110, the clamp 120, and the pipe fitting 150 and the components thereof can comprise or be formed from steel. In other aspects, any other material having desirable qualities can be used. Meanwhile, the O-ring 900 and any other readily deformable parts can comprise an elastic and resilient material, such as, for example and without limitation, an elastomer, polymer, or rubber.

A method of using the pipe fitting placement device 100 can comprise receiving the pipe fitting 150 within the fitting bore 137 of the device 100, the device 100 comprising: the bar 130 defining the fitting bore 137; and the saddle 140; positioning the pipe fitting 150 against the outer surface 82 of the pipe 80; and positioning the device 100 against the outer surface 82 of the pipe 80. The method can comprise removing the saddle 140 by removing the fastener 149; and installing a second saddle 140 in the fitting holder 110 and in the pipe fitting placement device 100 by reattaching the fastener 149, in which case the second saddle 140 can define a second pipe mating surface 441 defining a second radius R140 differing from the radius R140 of the original saddle 140.

The method can comprise contacting the pipe mating surface 441 of the saddle 140 with the outer surface 82 of the pipe 80, in which case each of the pipe mating surface 441 of the saddle 140 and the outer surface 82 of the pipe 80 can define a common radius. In some aspects, radii that are common will be radii being mathematically equal. In some aspects, surfaces having a substantially common radii will be mathematically equal in practice, at least under conditions in which the clamp 120, through the bar 130, is holding the pipe fitting 150 and the saddle 140 against the pipe 80 such that a radius of the pipe mating surface of the saddle matches the radius R80 of the outer surface 82 of the pipe 80. The method can comprise holding the pipe fitting 150 against the pipe 80 with the bar 130 with a clamp 120 with a force sufficient to overcome lifting forces acting on the pipe fitting 150.

The method can comprise drilling the hole 88 in the pipe 80 to place the bore 158 of the pipe fitting 150 in fluid communication with an interior cavity of the pipe 80. This drilling step can comprise attaching equipment to and/or through the pipe fitting 150 at the threads 562*a,b*. The method can comprise determining whether the pipe 80 is pressurized. This determining step can comprise measuring a pressure inside the bore 158 of the pipe fitting 150 or in equipment placed in fluid communication with the bore 158 of the pipe fitting and directly or through calculation or through both direct and indirect methods determining the actual or estimated pressure inside the pipe 80.

The method can comprise welding the pipe fitting 150 to the pipe 80. In some aspects, this can comprise two separate steps of welding of the pipe fitting 150 to the pipe 80. Welding the pipe fitting 150 to the pipe 80 can comprise fusing a material of the pipe fitting 150 to a material of the pipe 80 with sufficient heat to sufficiently and permanently adhere the two components of the pipe fitting placement system 50 to each other. Welding the pipe fitting 150 to the pipe 80 can further comprise, as an initial step, fusing a material of a welding rod to each of the material of the pipe fitting 150 and the material of the pipe 80 to provide an initial seal with minimal heat. The initial step of welding—with for purposes of the instant application can be described as a "cold-welding" step—can provide at least a fluid-tight seal that should not damage the O-ring 900 due to heat conduction from the welding equipment and welded parts through the pipe 80 and the pipe fitting 150. Once the initial seal is made, the seal can be maintained with a subsequent welding step that fuses each of the pipe fitting 150 and the pipe 80 not only to the welding rod but also to each other.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe fitting placement system comprising:
    a fitting holder comprising:
        a bar defining a fitting bore proximate to a first end of the bar, the bar further defining a second end distal from the first end, the bar being elongated in a longitudinal direction extending from the first end to the second end; and
        a saddle coupled to the bar proximate to the second end of the bar, the saddle rotatable about a saddle pivot axis with respect to the bar; and
    a pipe fitting received within the fitting bore of the fitting holder.

2. The system of claim 1, wherein the saddle is removable by disengagement of a fastener.

3. The system of claim 2, wherein the saddle is coupled to the bar with the fastener, the saddle extending into and rotatable within a saddle cutout defined in the second end of the bar.

4. The system of claim 1, wherein the saddle defines a pipe mating surface defining a radius.

5. The system of claim 1, wherein the pipe fitting defines a pipe mating surface defining a radius.

6. The system of claim 1, wherein the fitting holder further comprises a stop, the stop configured to prevent rotation of the pipe fitting with respect to the bar.

7. The system of claim 1, wherein the bar defines a handle cutout, the handle cutout configured to facilitate lifting of the bar and the fitting holder.

8. A fitting holder for a pipe fitting placement device, the fitting holder comprising:
    a bar defining a fitting bore proximate to a first end of the bar, the bar further defining a second end distal from the first end, the bar being elongated in a longitudinal direction extending from the first end to the second end; and
    a saddle coupled to the bar proximate to the second end of the bar, the saddle rotatable about a saddle pivot axis with respect to the bar.

9. The fitting holder of claim 8, wherein the saddle is removable by disengagement of a fastener.

10. The fitting holder of claim 9, wherein the saddle is coupled to the bar with the fastener, the saddle extending into and rotatable within a saddle cutout defined in the second end of the bar.

11. The fitting holder of claim 8, wherein the saddle defines a pipe mating surface defining a radius.

12. The fitting holder of claim 8, further comprising a stop extending between the bar and the pipe fitting and into each of the bar and the pipe fitting, the stop configured to prevent rotation of the pipe fitting with respect to the bar.

13. The fitting holder of claim 12, wherein the stop is a pin extending into a bore defined in the bar and into a bore defined in the pipe fitting.

14. The fitting holder of claim 8, wherein the bar defines a handle cutout extending from an upper surface of the bar to a lower surface of the bar, the handle cutout configured to facilitate lifting of the bar and the fitting holder.

15. A method of using a pipe fitting placement device, the method comprising:
   receiving a pipe fitting within a fitting bore of the device, the device comprising:
      a bar defining the fitting bore proximate to a first end of the bar, the bar further defining a second end distal from the first end, the bar being elongated in a longitudinal direction extending from the first end to the second end; and
      a saddle coupled to the bar proximate to the second end of the bar, the saddle rotatable about a saddle pivot axis with respect to the bar;
   positioning the pipe fitting against an outer surface of a pipe; and
   positioning the device against the outer surface of the pipe.

16. The method of claim 15, wherein the saddle is coupled to the bar with a fastener, the saddle being a first saddle, the first saddle defining a first pipe mating surface defining a first radius, the method further comprising:
   removing the first saddle by removing the fastener; and
   installing a second saddle in the pipe fitting placement device by reattaching the fastener, the second saddle defining a second pipe mating surface defining a second radius.

17. The method of claim 15, further comprising contacting a pipe mating surface of the saddle with an outer surface of the pipe, each of the pipe mating surface of the saddle and the outer surface of the pipe defining a common radius.

18. The method of claim 15, further comprising holding the pipe fitting against the pipe with the bar with a clamp with a force sufficient to overcome lifting forces acting on the pipe fitting.

19. The method of claim 15, further comprising:
   drilling a hole in the pipe to place a bore of the pipe fitting in fluid communication with an interior cavity of the pipe; and
   determining whether the pipe is pressurized.

20. The method of claim 15, further comprising welding the pipe fitting to the pipe.

* * * * *